United States Patent Office 3,433,239
Patented Mar. 18, 1969

3,433,239
PROCESS CONTROL INSTRUMENT HAVING
SIGNAL BOOSTER
Howard R. Jaquith, Rochester, and Stanley G. Norton, Jr., Spencerport, N.Y., assignors to Sybron Corporation, a corporation of New York
Filed July 18, 1966, Ser. No. 565,790
U.S. Cl. 137—85                                  3 Claims
Int. Cl. F15b 5/00; G05d 16/08

ABSTRACT OF THE DISCLOSURE

A pneumatic process control instrument has an output signal booster relay receiving both the manually-controlled and automatically-controlled outputs of the control instrument.

---

This invention relates to process control instruments having instrumentalities for operating a process control element. Each such instrumentality generates a signal and power is applied to the control element in accordance with such signal.

The general object of the present invention is to provide a new and improved form of process control instrument, one novel improvement being provision of a signal booster arranged to furnish power to the control element in response to signal generated by any of the said instrumentalities. Other improvements will be evident from the description and claims to follow.

Briefly, in an exemplary pneumatic form of the invention, the control instrument includes a pair of pressure regulator-like devices, each of which is constructed and arranged to produce an air pressure in accordance with which the process control element is to be operated. According to the invention, a signal booster is provided in the form of a pressure regulator-like device capable of responding to either such air pressure by producing a corresponding air pressure at a higher power level, and it is this last air pressure that is actually applied to the control element.

Figure 1:
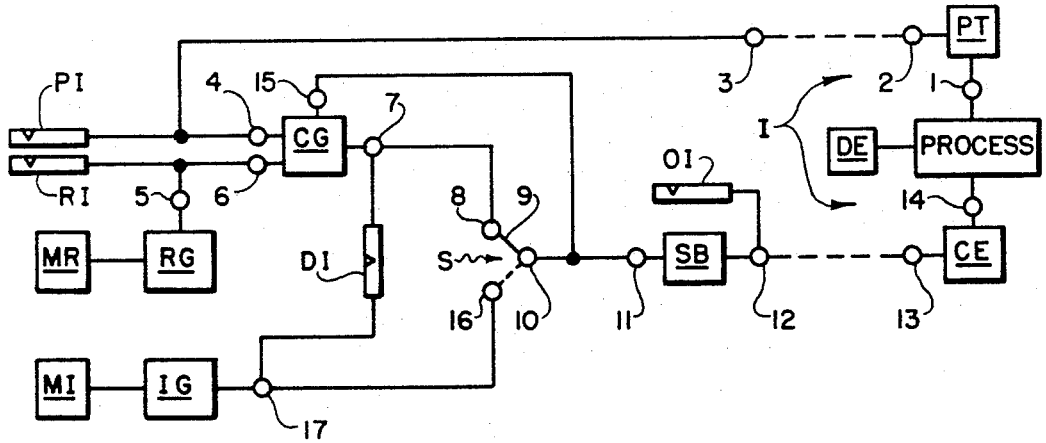
FIGURE 1 is a schematic diagram of a control system according to the invention.

In FIGURE 1, the box marked PROCESS represents some apparatus or environment wherein a variable such as temperature, liquid level, or the like, is to be maintained in predetermined relation to some reference value (of such variable or of a related variable). Box CE represents a control element which can be operated to affect the process in such manner as to maintain the said predetermined relation. Box DE represents a disturbing element which may act to affect the process so as to destroy the said predetermined relation.

As a very simple example (and one of many), PROCESS might be a tank containing fluid to be maintained at a given temperature, control element CE may be a valve controlling the application of heat to said fluid, and disturbing element CE may be some means of admitting unheated fluid to PROCESS, or of releasing heated fluid therefrom. Supposing the process fluid to be at the desired temperature, adding unheated fluid to the process fluid will obviously lower its temperature. If the temperature of the process fluid is being measured, as by a so-called process variable transmitter PT arranged to sense process fluid temperature and to produce a process signal proportional to said temperature, then control element CE can be operated in accordance with said signal to restore actual fluid temperature to the desired value. In this example, the predetermined relation is equality.

Conversely, if disturbing element DE releases heated fluid from the process, the remaining fluid overheats, a condition that would also be corrected by operation of control element CE in accordance with the process signal.

Commonly, means is provided for either automatically or manually operating the control element CE, usually at a location more or less remote from control element CE, transmitter PT and PROCESS, and in the form of a so-called process control instrument to which the process signal is transmitted by tranmitter PT. In automatic control, the process signal is applied to the instrument which automatically produces a control signal which is transmitted to the control element CE which responds to the control signal to change its effect on the process. In the fluid heating example, described supra, the control signal is such as to cause the control element to change the rate of heating in an amount proportional to deviation of the process variable from the predetermined relation, but in a sense such as to oppose such deviation. Frequently, the control signal may also include a component which causes the control element to also reflect the rate at which the process variable changes and/or the length of time the predetermined relation is deviated from. In manual control, a human operative manipulates some facility of the instrument to provide a signal to the control element with an effect similar to that of the control signal, such effect, however, being in a measure given by the judgment of the human operative.

In FIGURE 1, the functional elements of the instrument at the remote location are those entities at the left of the figure, and the dashed lines I represent the structure interconnecting the instrument and the remainder of the system, at the right of the figure.

The instrument elements, as shown, consist essentially of a control signal generator CG, a reference signal generator RG, a reference signal indicator RI, a device MR for operating the generator RG, a difference indicator DI, an auto-manual switch S, an independent signal generator IG, a device MI for operating generator IG, a signal booster SB which produces the signal actually applied to control element CE, a process variable indicator PI, and a signal booster output indicator OI. Commonly, devices MR and MI are mechanisms designed to be operated by the human hand.

Control signal generator CG provides for automatic operation. Thus, the process variable provides a signal at the input of transmitter PT which produces a process signal (i.e., a signal representative of the magnitude of the process variable) at its output 2. Structure I provides a signal channel that eventually ends in the process signal input 3 at the instrument. From input 3, the process signal goes to one input 4 of generator CG.

Device MR, at the same time, is arranged to cause reference signal generator RG to produce a reference signal at its output 5 (i.e., a signal representative of the desired value of the process variable), which is applied to another input 6 of generator CG. The reference signal, or its equivalent is applied to reference indicator RI, which in response indicates then the magnitude of the desired value of the process signal. Likewise, indicator PI receives the process signal and indicates the actual magnitude of the process variable.

The response of control CG to these two signals is to produce a control signal at its output 7 which is applied to an input 8 of a switch S which is connected by switchway 9 to switch output 10. Output 10 connects to the input 11 of signal booster SB. Signal booster SB produces a boosted signal representative of said control signal at its output 12. Output 12 is connected by structure I to input 13 of control element CE. In response to the boosted signal, control element CE provides a control effect at its output 14 which, in effect, is the input to the PROCESS. In response to the control effect, PROCESS changes the value of the process variable or maintains it in predetermined relation to the desired value thereof, depending on the characteristics of the signal applied to input 13 of control element CE.

Generator CG is normally a feedback device, and is here illustrated as having an input 15 to which its own control signal is applied as feedback from output 10 of switch S.

Switch S has a second input 16 to which switch-way 9 can be connected as illustrated in dashed line. In this state of the switch S, controller CG continues to produce a control signal, but now at the output 10 appears the independent signal produced by independent signal generator IG under control of device MI, independently of the remainder of the system, and at the output 17 of generator IG. The independent signal is therefore applied, via switch output 10, to input 15 of generator CG and to the signal booster SB. Accordingly, CE is under control of generator IG, but generator CG is still producing a control signal even though it is no longer determining the boosted signal of signal booster 12 and its own feedback signal.

Supposing the device MI is used to manually set the independent signal generator IG, then what has been described above are respectively the automatic and manual control states of the control instrument. The change between these states is made simply by changing switch-way 9 from one of switch inputs 8 and 16 to the other thereof. Before doing so, it is ordinarily necessary that the control signal at output 7 is the same in magnitude as the independent signal at output 17. Differential indicator DI is connected between outputs 7 and 17 and responds to said signals by indicating whether or not they are equal. If they are equal, the switch-way 9 may be changed. If they are not equal, one or the other of devices MI and MR can be operated to make generator IG change the magnitude of the independent signal until indicator DI indicates equality, whereupon switch-way 9 may be changed. The purpose of making the two signals alike before switching from manual to automatic control, or vice versa, is, as well known, to avoid unduly disturbing the process by the switching. That is, if the signals differ when switchover is made, the control element CE will change its control effect in accordance with the difference, which would be undesirable if the process variable were actually at its desired value at the time of switchover.

Figure 2:
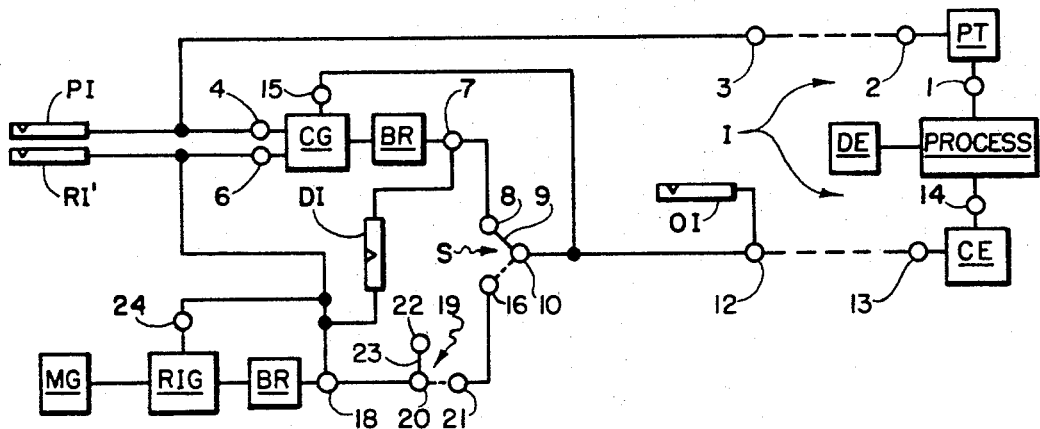
FIGURE 2 is a schematic diagram of a comparable control system according to the prior art.

The prior art system of FIGURE 2 mainly differs from the system of FIGURE 1 in lacking the signal booster SB, in having a switch 19, in addition to switch S, in combining the functions of generators IG and RG in a single reference and independent signal generator RIG, which is actuated by device MG, analogous to devices MR and MI, and in having booster relays BR to make up for the lack of booster SB. Analogous to indicator RI, there is an indicator RII which indicates the magnitude of the output signal of generator RIG. Output 18 of generator RIG is connected to the input 20 of switch 19. To the extent indicated by the proportion of reference characters common to FIGURES 1 and 2, both systems are otherwise substantially identical.

Generator RIG corresponds to generators RG and IG because, it can furnish both reference signal and independent signal. Thus, in the dashed line position of way 23 of switch 19, generator RIG provides independent signal to input 20 of switch 19, whose output 21 then applies independent signal to input 16 of switch S, so that if way 9 of switch S is in its dashed line position, control element CE is under control of generator RIG. In the full line position of way 23, the signal from generator RIG is shut off at switch 19 (i.e., its output 22 is sealed), but the generator output 18 has permanent connection to input 6, as FIGURE 2 shows, so that the generator RIG provides reference signal to generator CG irrespective of whether or not it is playing the role of independent signal generator for control element CE.

In the absence of a signal booster, generator RIG must itself serve as such, for proper performance of its role as independent signal generator, although in its role as reference signal generator this is not necessary. Likewise, generator CG must also provide the signal booster's function when generator CG is operating control element CE.

Accordingly, one booster relay BR is provided for generator RIG and a second booster relay BR is provided for generator CG. Each booster relay BR is of the character of the signal booster SB, namely, each amplifies the power of the output signal of its generator so that, in this respect, the signal at outputs 7 and 18, FIGURE 2, when they exist, are at the same power level as the signal at signal booster output 12, FIGURE 1.

One advantage of the FIGURE 1 system over the FIGURE 2 system is in respect of interconnecting structure I between output 12 and input 13, all of which constitutes a more or less lengthy transmission line loaded at one end by control element CE and driven from the other end by booster SB. Booster SB is naturally designed to provide more or less optimum driving efficiency for this line and its termination. As the instrument may be expected to be applied to varying sorts of loaded "transmission lines," it is ordinarily designed to handle the worst expected sort of line and load. Within the instrument itself no such demand is made of generators CG and IG. In FIGURE 2, conversely, each of the booster relays BR must necessarily be designed to meet the same demands as signal booster SB.

Of particular significance here is that in FIGURE 2 the boosted signals must pass through either switch S or switch 19 and switch S, depending on the settings of the ways 9 and 23. In fluid pressure operated instruments, signal changes result in flow of fluid. Inevitably, switches have greater flow resistance and leakage than the piping they interconnect, so that the switches in FIGURE 2 represent a burden on booster relays BR that is missing in the system of FIGURE 1, for there the single switch S is at the input of signal booster 12.

Another advantage of the FIGURE 1 system over the FIGURE 2 system is that only one switch is needed in the former for switching between automatic and manual control, whereas in FIGURE 2, the second switch 19 is required. Moreover, in FIGURE 2, an indication of the reference value is not always available since the significance of what RII indicates depends on the state of switch 19. Thus, in the dashed line position of way 23, generator RIG would be operating control element CE, but not necessarily with a value of independent signal that is the same as the value of reference signal later to be provided generator CG for control of control element CE by generator CG.

The foregoing description has not specified the nature of the various signals involved. In principle, the various signals and energies may be derived from electrical current, air or liquid under pressure, etc. Indeed, a system according to the invention may involve signals of differing energy form. For example, devices MR and MI will frequently be mechanisms operated by human made power, irrespective of what other sorts of energy may be utilized in the system.

However, the invention of FIGURE 1 is peculiarly adapted to pneumatic control instruments where, in the main, power for operating the elements of the system and the resulting signals will be air pressure, and control element CE will be a valve, or the like, driven by a diaphragm motor, or equivalent, sometimes with the help of a so-called valve positioner mounted on the control element structure along with the valve motor.

Figure 3:
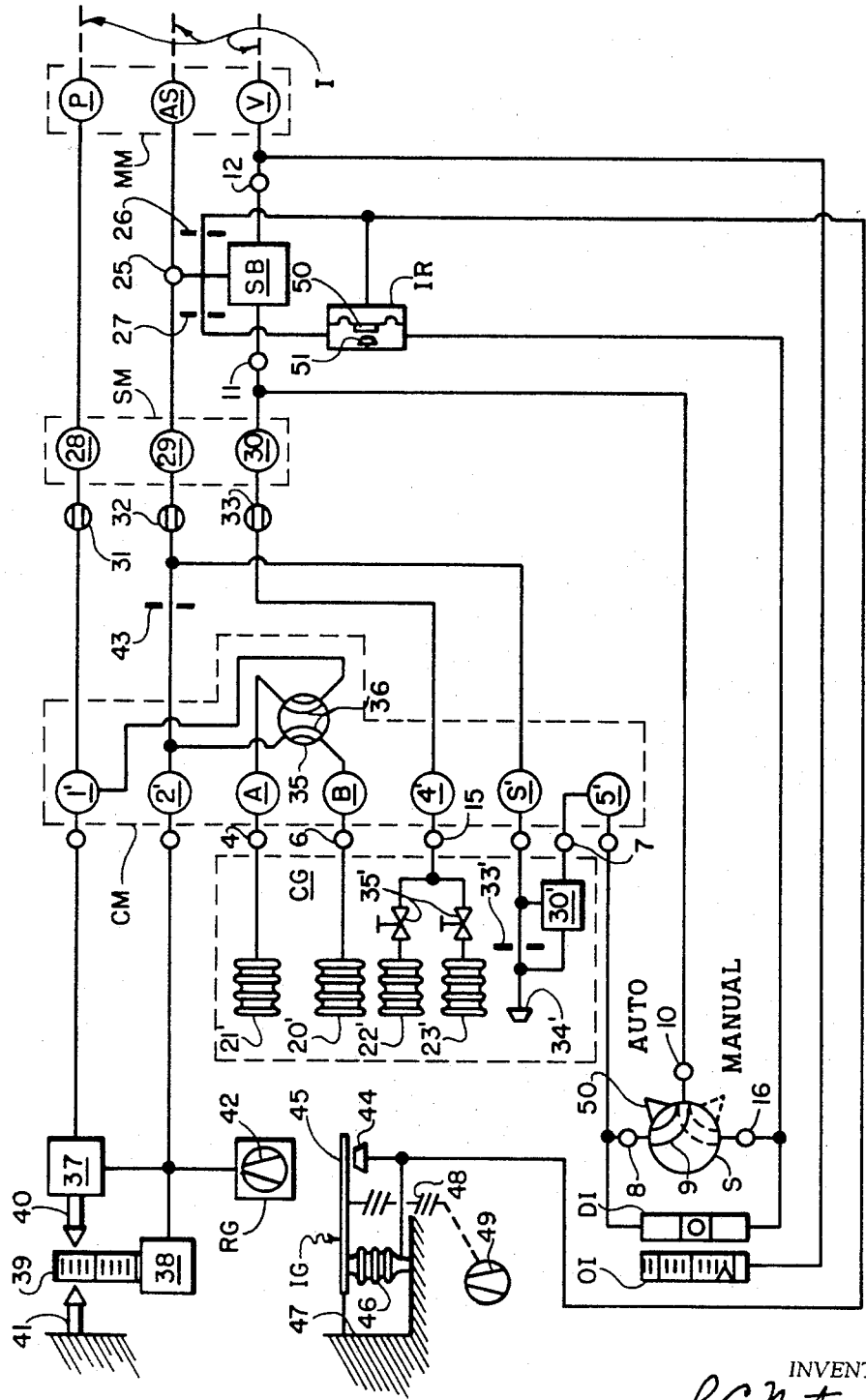
FIGURE 3 is a schematic diagram of a pneumatic version of part of the control system of FIGURE 1.

FIGURE 3 illustrates such pneumatic control instrument, that is, an air-operated version of that part of FIGURE 1 to the left of interconnecting structure I, which latter connects to a main manifold MM having ports or connections P, AS and V, and is in the form of suitable pipes respectively to a process variable transmitter providing an air pressure whose magnitude is representative of the actual value of the process variable, to a source of air under pressure for energizing the instrument, and to the motor of a control element.

The supply of pressure available from port AS is distributed to the several elements via the usual flow restricting orifices, and piping. Thus, booster SB, generator IG, and a 1:1 isolating relay IR are supplied from a connection 25, the latter via orifices 26 and 27, respectively. The process pressure is piped from its source, port P, in effect, to port 28 of a secondary manifold SM, and supply pressure is piped from its source, port AS, in effect, to port 29 of manifold SM. A third port 30 of manifold SM is piped to input 11 of booster SB, whose output 12 is piped to port V of manifold MM. Piping including valves 31, 32 and 33 connects ports 28, 29 and 30 to ports 1', 2' and S', and 4', respectively, of a controller manifold CM.

Control signal generator CG is mounted on manifold CM with its several inputs 4, 6 and 15, and its output 7, connected, respectively, to manifold ports A, B, 4' and 5'. Generator CG includes bellows 20', 21', 22' and 23', restrictors 35', orifice 33', nozzle 34' and booster relay 30', there being a further air supply input (not delineated in FIGURE 3) connecting booster relay 30' to port S' for air supply thereto, and the nozzle 34' being connected by an orifice 33' to the air supply to relay 30'.

Generator CG, as shown, is basically identical to the controller C of U.S. patent application S.N. 442,962, Mar. 26, 1965 of J. Philip Hurdle, and assigned to the assignee of the present invention. The primed reference numerals indicate the same parts in controller CG as are indicated by the corresponding unprimed reference numerals used in FIGURE 1 of the Hurdle application. Generator CG does not have the Hurdle cut-off relay 31 because the feedback loop of the generator CG is taken through the switch S, which, in effect, performs the function of a cut-off relay, a practice not unknown in the prior art. The operation of the generator CG is essentially the same as that of controller C and, except for its switching arrangement AA and cut-off relay 31, the Hurdle control system is the same as the system shown in FIGURE 2 of the present application. However, Hurdle switching arrangement AA and cut-off relay 31 are functionally equivalent to the switches S and 19 of present FIGURE 2.

It is therefore unnecessary to further describe generator CG. It is, of course, a sort of pressure regulator which regulates its output pressure in correspondence to deviation of the controlled process with respect to some desired state.

Manifold CM corresponds to Hurdle manifold M in structure and function except as to ports A, B and 3, and a reversing switch 35. Manifold CM has no port like Hurdle port 3 because the latter is for cut-off relay 39. Ports A and B and reversing switch 35 of manifold CM permit easy reversing of the sense of the relation between generator output and input. As shown, for example, suppose control signal at output 7 increases when process signal increases. However, if ways 36 of switch 35 be rotated 90°, the connections of port 1' and port 2' to generator CG will interchange, and therefore control signal would decrease for increase of process signal over reference signal.

A differential pressure responsive device 37 receives the process pressure in port 1', and the generator RG produces a pressure in port 2' that is applied to a pressure responsive device 38 and also to device 37. Device 38 moves a calibrated scale vertically to positions representative of the reference pressure in port 2', preferably in terms of the process variable represented thereby. Device 37 moves a pointer 40 along said scale in proportion to the difference in the pressures applied thereto, again preferably in terms of the process variable. A fixed pointer 41 is arranged beside scale 39. By means such as a rotatable knob 42 (which corresponds to mechanism MR of FIGURE 1), the pressure in port 2' is adjusted to some desired value as indicated by the position of the scale 39 with respect to pointer 41. The scale, pointers, etc., are so proportioned and constructed that when the pressure in port 1' is the same as the pressure in port 2', pointers 40 and 41 indicate the same value on scale 39. When the instrument is operating, therefore, the desired value of the process variable is indicated by pointer 41, the actual value is indicated by pointer 40, and the difference between pointer positions gives the deviation of the process variable from the desired value.

Generator RG is connected to air supply in port 29 via port 2', an orifice 43, and valve 32, and is preferably a simple baffle-nozzle pressure regulator device such as independent signal generator IG is shown to be in FIGURE 3. Generator IG is shown as including a nozzle 44, a baffle 45 and a bellows 46, nozzle 44 and bellows 46 connecting together and to supply AS (via orifice 26). If baffle 45 throttles nozzle 44 (from which, of course, air escapes to atmosphere, if the baffle permits) the air pressure in bellows 46 will increase, extending it. Both bellows 46 and baffle 45 have one end fixed as indicated at 47 with the bellows arranged to lift the baffle off the nozzle when the bellows extends. However, the bellows does this against the force of a spring 48, which has one end secured to the baffle and its other end connected to a mechanism including knob 49 (corresponding to mechanism MI, FIGURE 1, hereof), such mechanism being fixed with respect to 49, but so arranged as to allow the spring to be tensioned to various degrees by use of knob 49. Since spring tension applies downward force and bellows pressure applied upward force (the bellows, of course, may contribute some spring-force, too), the baffle 45 assumes a position where just enough air escapes from nozzle 44 to maintain a balance of the said forces. This well-known arrangement creates a pressure in bellows 46, nozzle 44 and the piping connecting these to the orifice 26, that is proportioned to the tension in the spring. Thus, knob 49 (or knob 42, in the case of generator RG) are turned till the desired value of pressure is obtained.

Indicator DI and switch S are shown in somewhat less abstract form in FIGURE 3 than in FIGURES 1 and 2, the former being represented as the indicator D of the Hurdle application, and the latter as a typical sort of rotary structure, defining two mutually-exclusive, alternate signal paths. Naturally, when an input of switch S is not connected by way 9 to output 10, that input is sealed off by the switch structure.

It is obvious from inspection that the system of FIGURE 3 functions like the system of FIGURE 1, with two exceptions, now to be noted.

First, the system of FIGURE 3 includes the isolating relay IR, and it is the pressure from this relay that is transmitted to input 16 of switch S rather than the output pressure of generator IG directly. Relay IR is essentially a pressure replicating device including a diaphragm 50 and a nozzle 51, said nozzle providing an exhaust to atmosphere of pressure on the left side of diaphragm 50. Air pressure, via orifice 27, pressurizes the left side of diaphragm 50 and connects, via the relay, to input 16 of switch S. At the same time, the right side of diaphragm 50 is pressurized by the air pressure from orifice 26. The arrangement, which is a well-known one, is that diaphragm 50 baffles nozzle 51 to the extent that escape of air through the nozzle 51 is just enough to keep the left side pressure on diaphragm 50 equal to the pressure on the right side thereof.

In effect, relay IR repeats the pressure established by generator IG into switch input 16, and its purpose is simply to prevent pressure interaction. It will be observed that the air supply represented by port AS is the common power supply for the three generators and signal booster SB (as shown: in actual instruments there may be additional devices so powered), and it is therefore necessary to prevent coupling of signals via the power supply, the various orifices and relay IR being usual sorts of means for providing isolation.

The second exception is that the generator CG includes the booster relay 30′, though in connection with FIGURE 1 it was indicated that such is unnecessary. In a pneumatic system, operation involves transfer of quantities of air from one part of the system to another, and between the system and the external atmosphere. That part of the system extendnig from booster SB to control element CE involves relatively high-power requirements, that is, relatively large quantities of air must be supplied and wasted therefrom, in optimum time. In effect, booster SB is basically a device that receives a relatively low power signal and more or less replicates it at a relatively high power level.

In this, the booster relays BR, referred to in connection with FIGURE 2, are equivalent to booster SB. However, booster relay 30′ of generator CG, FIGURE 3, is not in the same category, because its use in generator CG, FIGURE 3, is to amplify the magnitude of the pressure in nozzle 34′. It will be recalled that, in this sort of controller, baffle mechanism, not shown, but actuated by the controller bellows, throttles escape of air from nozzle 34′, thus varying the air pressure in the nozzle. Normal controller design involves amplifying the value of this pressure before applying it to the bellows 22′ and 23′ in order to get the effective range of nozzle pressure variation up to that of the reference and process variable pressures. In conventional instruments, the booster relay is also designed to simultaneously raise the power level to one suiting the final control element also. In the present controller, however, relay 30′ need amplify only the nozzle pressure magnitude, because signal booster SB takes care of the power demand.

Notwithstanding the foregoing, the generator CG need not be one having a booster relay 30′, for there are some processes that can be satisfactorily controlled by a control signal generator constructed after the style of independent signal generator IG, as shown in FIGURE 3, that is, one where the nozzle back pressure is used directly as feedback pressure and as output pressure, provided, of course, booster SB be provided to raise the power level of the nozzle back pressure for use by the process final control element.

Booster relay 30′, if needed, is designed to suit merely the more or less fixed needs of generator CG irrespective of the requirements of control element CE, whereas booster SB is essential and has to be able to handle a variety of possible power demands.

Booster SB may be substantially the same as shown at E in either FIGURE 1 or FIGURE 2 of U.S. Letters Patent No. 2,638,922 to W. I. Caldwell, granted Mar. 19, 1953 and assigned to the assignee of the present invention. Relay IR may be the same as that shown at B of the Caldwell patent.

The control instrument of FIGURE 3 is normally provided with a support or housing peculiarly suiting the arrangement of elements shown in FIGURE 3.

Figure 4:
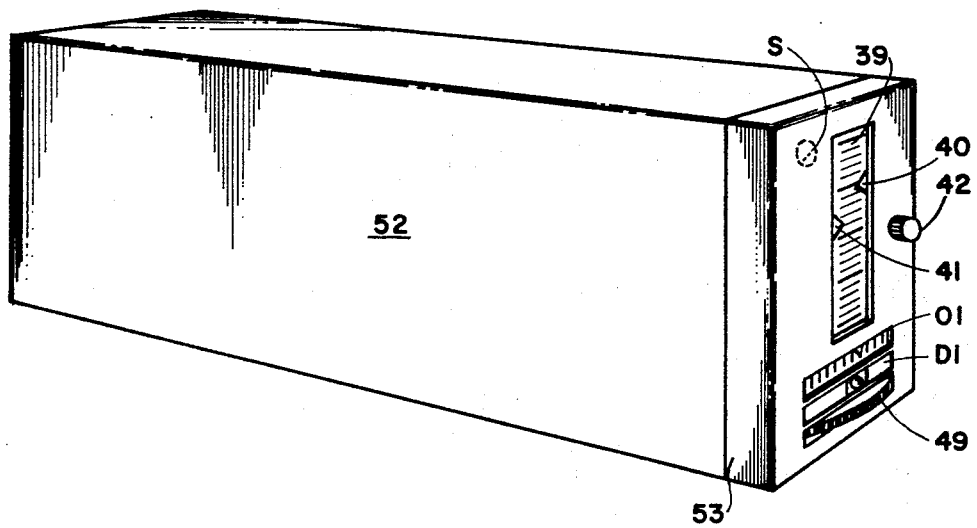
FIGURE 4 is a front perspective view of an instrument according to the invention provided with a housing.

In FIGURE 4, an elongated, rectangular-cross-section casing or housing 52 contains the structure identified in FIGURE 3 as the control instrument. Casing 52 has a face plate 53 having various slots, apertures, etc., through which can be seen scale 39, pointer 40 and indicators OI and DI. Pointer 40 is shown projecting from the side of the slot framing scale 39. Knobs 42 and 49 project through the plate for easy access, whereas switch S is located behind the plate which may have a movable portion providing access to switch S when wanted.

Figure 5:
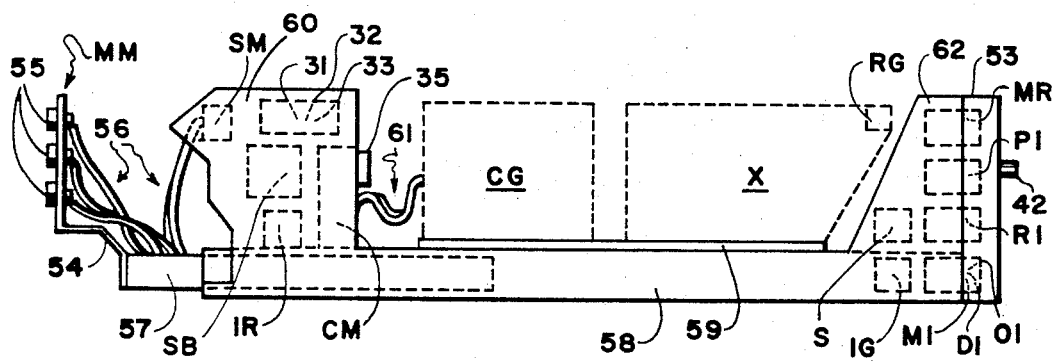
FIGURE 5 is a side view of an instrument according to the invention showing the design of the elements thereof for the purpose of housing as shown in FIGURE 4.

FIGURE 5 shows the structure of the instrument inside the housing 52. Here manifold MM is shown as an angled plate 54 having the nipples 55 mounted thereon. Nipples 55 provide the ports P, AS and V and connect via flexible air hose 56 to the manifold SM. Hose 56 has a substantial amount of slack therein, said slack reposing in a sort of tray 57 fixed to the bottom of plate 54. Plate 54 is normally fixed to the rear end of casing 52.

The main body of the instrument is supported on a chassis 58, chassis 58 being a channeled plate having a sub-chassis 59 mounted there. Chassis 58 has at one end a pair of wings 60 (only one is visible in the figure) projecting up therefrom and providing a support for manifold SM, booster SB, valves 31, 32 and 33, and manifold CM, shown in dashed line, and connected by various means such as air hose (not shown) after the fashion of FIGURE 3. More air hose 61 (with a certain amount of slack) connects manifold CM to generator CG which is secured to chassis 59. The channeled portion of chassis 58 opens downward to accommodate part of tray 57 and, at the front, the structure of generator IG and mechanism MI (reverting to the symbolism of FIGURE 1, for this view of the instrument). The front end of chassis 58 has a pair of wings 62 (only one is visible in the figure) projecting up and one thereof provides support for switch S.

Face plate 53 encloses indicators RI, OI, PI and DI, and mechanism MR (again reverting to the symbolism of FIGURE 1). Generator RG is also at the front end of the chassis and conveniently is supported on any handy structure in that area, preferably on chassis 58.

Dashed outline x represents mechanism, such as devices 38 and 39, for example, or alarm devices and the like (not shown).

Casing 52 is designed so that chassis 58 can be slid out of it to the extent slack in hose 56 allows it, preferably far enough to provide access to the manifold CM, without interrupting any hose connections. Such withdrawal allows removal of generator CG, mechanism x, chassis 59 and other entities at the front end of the chassis. In fact, the chassis can be stripped clean of everything not essential to manual control of the element CE (not shown in FIGURE 5) without interrupting manual control. Likewise, flexible air hose can be used to provide most or all connections and by providing slack therein, the elements of the instrument can be manipulated in various ways without interrupting or affecting operation. When removing elements, valves 31, 32 and 33 in general will be closed and the instrument in manual control. Additional air hose (not shown) connects generator IG, switch S (except input 8), and one side of indicator DI (which, as shown in the Hurdle application, allows no significant through flow of air) to the air supply, relay IR and booster SB, independently of manifold CM, so that as long as the manual control entities are operative, manual control can be performed, irrespective of the operability of the remainder of the instrument.

Various modifications of the described instrument are possible. Obviously, specifically different forms of the various generators may be used. Again, independent signal generator IG can be operated automatically, rather than manually.

The spatial organization of parts indicated in FIGURES 3, 4 and 5, while convenient, is not critical. Likewise, the indication facilities of these latter figures define but one example of an indicating arrangement suitable for use in an instrument according to the invention, and other, equivalent arrangements are known in the prior art. For instance, indicator DI could be replaced by a conventional differential pressure gauge, or even two ordinary pressure gauges whose readings would have to be compared by the user of the instrument.

The foregoing description has been provided to fulfill the requirements of the statutes, but is not to be taken as limiting the scope of our invention, which last is rather to be ascertained from the claims appended hereto.

We claim:
1. A process control instrument comprising, in combination, the following elements:
   a control signal generator,
   a process signal source,
   a reference signal generator,
   an independent signal generator,
   signal switching means, and signal boosting means;
   said control signal generator being responsive to said process signal and said reference signal to produce its said control signal in a measure representative of the relationship between said process signal and said reference signal; said signal boosting means being so responsive to signal applied thereto as to produce a boosted signal representative of such applied signal; said signal switching means being operable to a first state wherein it applies said control signal to said signal boosting means as said applied signal; said signal switching means being operable to a second state wherein, instead of said control signal, it applies said independent signal to said signal boosting means as said applied signal;
   said signal boosting means and each said generator being of the type providing its said signal in the form of a regulated fluid pressure and having connection to an external source of fluid under pressure for providing pressure fluid to be regulated, and all said elements being mounted in a common housing; said housing having a main manifold having a first port for connection to said external source, a second port for connection to a load capable of utilizing said boosted signal, and a third port for connection to an external generator of said process signal; said signal booster means being connected to said second port for providing said boosted signal therein, and being connected to said first port for supply of pressure fluid to be regulated; said elements including a manifold having a fourth port connected to said first port, and a fifth port connected to said third port; said control signal generator and said reference signal generator being connected to said fourth port for supply of pressure fluid to be regulated, and said control signal generator being connected to said fifth port for supply of said process signal; said independent signal generator being connected to said first port for supply of pressure fluid to be regulated; said signal booster means including an input connected via said signal switching means to signals as in said first and second states of said switching means.

2. The process control instrument of claim 1, wherein said control signal generator has a feedback loop for application thereto of fluid pressure for characterizing said control signal, and the second said manifold has a sixth port, said sixth port being connected to said input of said signal booster means, independently of said signal switching means; said signal switching means being arranged to provide said input with control signal or with independent signal, in accordance with its said first and second states, said feedback loop being connected to said sixth port for application, to said loop, of pressure in said sixth port.

3. The process control instrument of claim 1, including a chassis in said housing, said chassis being withdrawable from said housing, said elements being supported on said chassis, and the second said manifold being supported on said chassis; the first said manifold being a fixed part of said housing and having solely flexible connections to elements on said chassis; said flexible connections being sufficiently long to permit said chassis to be withdrawn from said housing without interrupting said connections.

References Cited

UNITED STATES PATENTS

| | | | |
|---|---|---|---|
| 2,638,117 | 5/1953 | Horn | 137—625.29 X |
| 2,701,576 | 2/1955 | Higgins | 137—84 |
| 2,747,595 | 5/1956 | Dickey | 137—82 |
| 3,025,868 | 3/1962 | Jaquith | 137—85 |

ALAN COHAN, *Primary Examiner.*